March 10, 1942.   R. G. STURM ET AL   2,275,573
ENERGY DISSIPATING OR SHOCK ABSORBING UNIT
Filed May 4, 1940
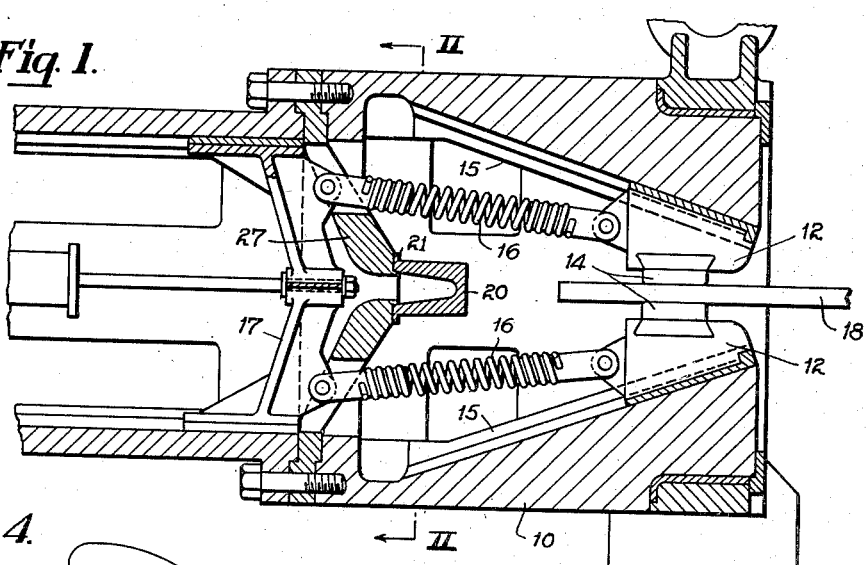
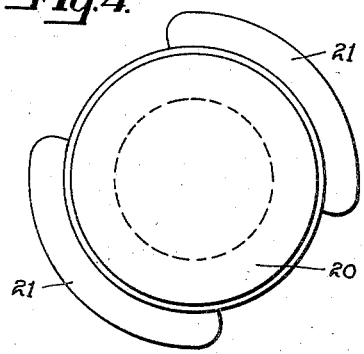
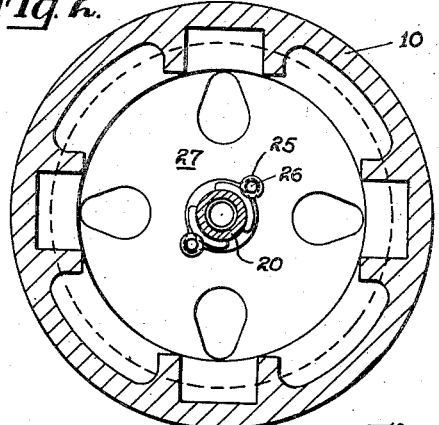
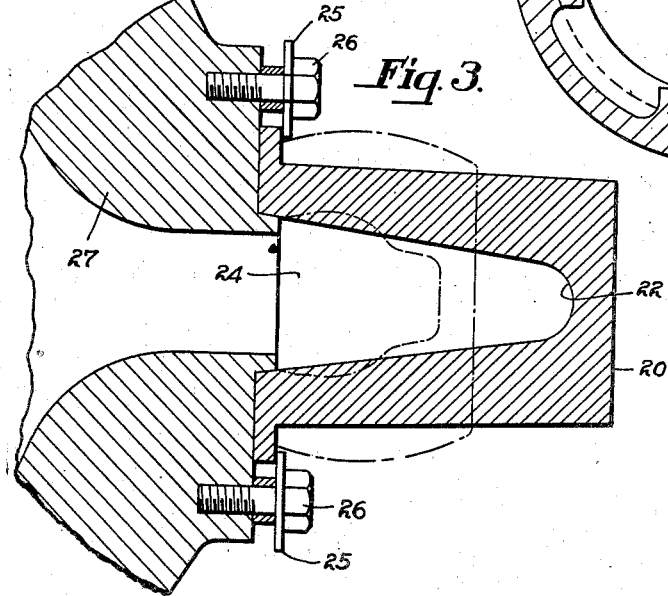
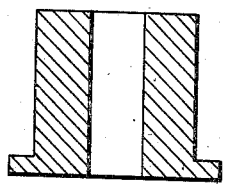
INVENTORS
Rolland G. Sturm &
Ernest Jeffries
BY S. Ernest Low
ATTORNEY Patented Mar. 10, 1942

2,275,573

UNITED STATES PATENT OFFICE 2,275,573

ENERGY DISSIPATING OR SHOCK ABSORBING UNIT

Rolland G. Sturm, New Kensington, and Ernest Jeffries, Oakmont, Pa., assignors to Aluminum Company of America, Pittsburgh, Pa., a corporation of Pennsylvania Application May 4, 1940, Serial No. 333,374

6 Claims. (Cl. 188—1)

This invention relates in general to improved means and apparatus for dissipating kinetic energy. In particular, the invention is directed to an improved type of shock absorbing unit or buffer for dissipating static and impact loads and forces.

The current trend in industry, as exemplified by the design and development of machine tools and fabricating machinery of increased capacities heretofore neither experienced nor contemplated, as well as the introduction of rolling stock and traction units of increased speeds, has presented a serious problem in providing suitable energy dissipating mechanisms for counteracting the loads, forces, and kinetic energy encountered as a normal consequence from the operation of such devices. The problem, as it has heretofore existed, was satisfactorily handled by the provision of resilient or fluid type shock absorbing or buffer units. Such known and available units, however, are of little or not practical value in that they are either insufficient in capacity to dissipate the loads experienced and herein contemplated, or if constructed in an effort to meet operating conditions, would be so large as to be out of all proportion with the mechanism with which they are to be used.

The invention to be hereinafter described in detail is primarily directed to shock absorbing or buffer mechanisms capable of adaption and use in manufacturing equipment and traction units wherein excessive forces are employed and experienced in the normal operation of such units. For example, the invention has found ready adaptability and success in anti-climber devices employed in tramways and traction units, as well as in association with structural shape stretching mechanisms, wherein impact forces of exceedingly high magnitude are of common occurrence and must of necessity be dissipated to maintain continued use of such equipment.

Although the invention has been associated with, and incorporated in, numerous types of commercially used mechanisms, it has been elected to describe the invention in its association with a structural shape stretching apparatus where its success has been outstanding as measured in terms of duration of service, with reduced maintenance, in maintaining the stretching machine in daily productive use. A particular stretching machine with which the energy dissipating device of this invention has been successfully employed is that mechanism illustrated in United States Letters Patent No. 2,164,343, issued under date of July 4, 1939, which machine has been constructed with a capacity of 750,000 lbs.

In brief, the shock absorbing or energy dissipating mechanism of the invention takes advantage of the principle that the energy of a blow, force, or load can be dissipated through the plastic deformation of a deformable material or metal without the aid of mechanical instrumentalities incorporating relatively movable parts. Further, the shock absorbing unit of the invention contemplates adaptation and operation in a range above that wherein spring type or similar resilient energy dissipating mechanisms could be successfully employed. It is in view of this principle and fact that the hereinafter described invention is described in terms of a shock absorbing unit or instrumentality in the form of a plastically deformable member as distinguished from known types of fluid and resilient shock absorbers.

It is an object of the present invention to provide a unitary shock absorbing unit in the form of a plastically deformable metal buffer entirely devoid of springs or equivalent resilient members.

Another object of the invention is to provide a one-piece plastically deformable shock absorber of such section and conformation that the maximum resisting force offered by the shock absorber is accurately predictable and controllable.

It is a further object of the invention to provide a simplified buffer type shock absorber which is economical in construction and readily replaceable following its destruction.

Other objects and advantages will be apparent and will present themselves following consideration of the description hereinafter presented when taken in conjunction with the illustrations appended hereto, and in which:

Fig. 1 illustrates a fragmentary sectional view through a head or tailstock of a stretching mechanism with which the shock absorbing unit of the present invention has been associated;

Fig. 2 illustrates a sectional view taken along the line II—II of Fig. 1;

Fig. 3 illustrates a sectional view to enlarged scale of the buffer block shown in Fig. 1;

Fig. 4 illustrates a top plan view of the buffer block of Fig. 3; and

Fig. 5 illustrates a modified form of buffer block in sectional elevation.

Referring to the drawing, 10 represents the main frame or casting of a tail or head stock of a stretching mechanism. A plurality of material gripping jaws 12, provided with suitable serrated inserts 14, are slidingly supported within the frame 10 upon suitable inclined ways 15. The jaws 12 are connected through suitable linkage 16 to a common yoke member 17, which is reciprocable by any suitable means, for example, hydraulic cylinder or the like, to advance the jaws 12 into material gripping position or to retract the same to release material so held.

Preferably co-axially disposed, with respect to the axis of material 18 within the jaws 12, is the shock absorbing unit of this invention. The shock absorbing or energy dissipating device comprises a generally hollow block 20 of plastically deformable material, preferably metal, which, in its preferred form, is constructed in the form of a frustum of a right circular cone having basically disposed ears or flanges 21. The block 20 is preferably constructed with a closed outer end 22 and is provided with an interiorly diverging aperture towards its open end 24.

The shock absorbing member or block 20 is mounted, through the medium of suitable clamp washers 25, in cooperation with the aforementioned ears or flanges 21, and cap screws 26, upon a supporting member or bracket 27 here shown in the form of a dish-shaped disk rigidly secured to a portion of the main casting 10. It is to be noted that the major axis of the frustrum of the right circular cone shock absorber block 20 in its relationship with its supporting member 27, is co-axial with the axis identifying the direction of pull of the stretching head 10.

In the operation of the shock absorber of the instant invention, reference is specifically made herein to Fig. 3. In Fig. 3 the bumper block or shock absorber 20 is illustrated in broken lines in a plastically deformed condition. The broken line outline of the block 20 following plastic deformation is an exact representation to scale of a shock absorber made from commercially pure aluminum following absorption by the block of 100,000 ft. lbs. of energy.

In further explanation, shapes or structural members usually fracture, if and when they do fail during a stretching operation, adjacent one or other of the stretching heads. When such a fracture occurs, the longer length of the fractured material actually reacts as a projectile in its travel backwardly through the gripping jaws 12 into contact with the shock absorbing unit 20. It will be manifest that the energy developed by such a projectile is susceptible of reaching extremely high magnitude, depending upon the pull being applied by the stretching mechanism at the time a fracture occurs.

By constructing the shock absorbing member 20 in the preferred form herein illustrated in the drawing, it has been discovered that it is possible to predict and control deformation of the material of the shock absorber and obtain maximum shock absorbing capacity with a controllable total resisting force whose magnitude can be predicted and hence provided for in the design of the supporting structure for the shock absorber. The closed end 22 of the shock absorber is also significant in that it insures distribution of shock resulting from off-center impact loading.

In Fig. 5 a modification of the shock absorber of this invention has been illustrated. Therein the shock absorber is substantially cylindrical or tubular in form and is otherwise employed in the same manner as the previously described bumper block 20. As in the preferred form of shock absorber of this invention, the tubular form shown in Fig. 5 may be so proportioned that the resisting force can be readily controlled and predicted. Normally, the thinner the wall of the shock absorber of Fig. 5 the greater the amount of deformation under impact, the deformation usually taking the form of a series of bulges as distinguished from the single bulge (Fig. 3) of the preferred form of the invention.

Although numerous plastically deformable materials, metals, and their alloys will serve the purpose of the present invention, it has been found that aluminum and its alloys have fully satisfied the requirements of the present invention since they readily lend themselves to economical duplication of shock absorbers of the type herein contemplated through the application of standard casting procedures, such as permanent mold casting.

Although the invention has been illustrated and described herein in terms of a specific example and embodiment of the same, it is to be understood that it is not to be interpreted as limited thereto except as defined in the claims appended hereto.

What is claimed is:

1. An energy dissipating member comprising a block of plastically deformable, non-resilient material constructed in the form of a hollow open frustum of a right circular cone.

2. An energy dissipating member comprising a block of plastically deformable metal constructed in the form of a hollow open frustum of a right circular cone.

3. A shock absorber comprising a cup-shaped block of plastically deformable metal constructed in the form of a right circular cone.

4. A shock absorber comprising a cup-shaped block of plastically deformable, non-resilient material disposed in impact receiving position with its closed end disposed to receive an impact blow, said block being interiorly provided with an outwardly diverging bore in the direction of its open end.

5. A shock absorber comprising a cup-shaped block of plastically deformable metal disposed in impact receiving position with its closed end disposed to receive an impact blow, said block being interiorly provided with an outwardly diverging bore in the direction of its open end.

6. An energy dissipating member in the form of a block having an interior cavity open to atmosphere, said block being constructed from plastically deformable, non-resilient material, a flange adjacent an end of said block for rigidly securing the same to a member subjected to impact loading, said block being otherwise unsupported and being disposed with its major axis in substantial alignment to receive impact energy producing forces.

ROLLAND G. STURM.
ERNEST JEFFRIES.